United States Patent [19]
Frey

[11] Patent Number: 6,146,695
[45] Date of Patent: Nov. 14, 2000

[54] INTERNAL WELD PROTECTION OF SHEET METAL PIPES

[76] Inventor: Ernst M. Frey, Lauenen 680A, CH-3655 Sigriswil, Switzerland

[21] Appl. No.: 09/125,817

[22] PCT Filed: Mar. 3, 1997

[86] PCT No.: PCT/CH97/00082

§ 371 Date: Oct. 13, 1998

§ 102(e) Date: Oct. 13, 1998

[87] PCT Pub. No.: WO97/32685

PCT Pub. Date: Sep. 12, 1997

[30] Foreign Application Priority Data

Mar. 6, 1996 [CH] Switzerland ................ 587/96

[51] Int. Cl.[7] .................. B05D 7/22; B05D 3/02; B05C 7/08
[52] U.S. Cl. .............. 427/230; 427/239; 427/385.5; 427/388.1; 427/422; 118/58; 118/302; 118/306; 118/317
[58] Field of Search .................... 427/230, 239, 427/422, 385.5, 388.1; 118/58, 302, 306, 317

[56] References Cited

U.S. PATENT DOCUMENTS 3,077,171 2/1963 Gotsch et al. .
3,733,670 5/1973 Troughton .............................. 29/200 A
5,296,078 3/1994 Frey ........................................ 156/466

FOREIGN PATENT DOCUMENTS 3127881 11/1982 Germany .
59-078786 5/1984 Japan .

Primary Examiner—Shrive Beck
Assistant Examiner—Michael Barr
Attorney, Agent, or Firm—Bachman & LaPointe, P. C.

[57] ABSTRACT

The invention relates to a continuous protective film, consisting of a thermoplastic synthetic material, which is applied to the inner side of the longitudinal weld of sheet metal pipes which are supplied end to end across the welding arm of a welding machine and an adjacent applicator arm. The thermoplastic synthetic material is continuously melted and applied using an applicator nozzle across at least the entire width of the weld. The thermoplastic synthetic material fed continuously is preheated, melted and conveyed to the applicator nozzle in a homogeneous liquid state. The discharge opening of the nozzle is subsequently guided at an adjustable constant distance from the inner side of the longitudinal weld of the sheet metal pipes, and the liquid synthetic material is applied in metered quantities. The melting apparatus for carrying out the process comprises means for guiding the discharge opening of the applicator nozzle. The means are, for example, a follow up roller, a sliding block, or a probe.

15 Claims, 4 Drawing Sheets

INTERNAL WELD PROTECTION OF SHEET METAL PIPES

The invention relates to a process for application of a continuous protective film of a thermoplastic material on the inside of the longitudinal weld seam of metal tubes which, lying against each other at the ends, are guided over the weld arm of a welding machine and an attached application arm, where the thermoplastic material is continuously melted and applied by means of an application nozzle at least over the entire width of the internal weld seam. The invention also concerns a device for performance of the process.

BACKGROUND OF THE INVENTION

Welding machines are known which have a system attached "in-line" for application of a thermoplastic material which applies a protective film to the longitudinal weld seam of metal tubes, in particular longitudinally welded tin and can sleeves. In principle there is a difference between application of a paint and a powder which is processed locally into a layer covering a seam.

Depending on machine type, the protective film is applied from above or below, where the metal tube to be processed is transported in the longitudinal direction of the application arm suspended on an application arm for application of the protective film from above, and in contrast standing on a conveyor belt for application from below.

In particular for the tinned metal cans used for the foodstuff industry, a clean sterilization-resistant internal covering of the weld seam with an uninterrupted protective film is of greatest importance. The tolerance to foodstuffs also requires the protective layer to resist hard mechanical processing such as the application of beads or edging. The application of the sterilization-resistant "hotmelt", as thermoplastic adhesives are known for short, has previously failed due to the fact also that these could not be applied with the technical means suitable for the conditions and could not withstand the said mechanical stresses.

EP, A1 0591107 describes a process for continuous application of protective coatings to cover a longitudinal weld seam of metal tubes. A hotmelt mass is guided continuously as a flexible hotmelt bead through the welding arm of a welding machine and deflected in the direction of the inside of the longitudinal weld seam of the metal tube. An application device presses the hotmelt bead onto a metal tube where it is melted and spread evenly over the width of the longitudinal weld seam. At the same time as the internal coating, an external protective coating can be applied to the longitudinal weld seam which allows elimination of the burning or drying oven. Although the welding and application arms with the coating device lie directly behind each other and the longitudinal weld seam of the continuous metal tube is still very hot at the application head, industrial practice has shown that melting the hotmelt bead on the longitudinal weld seam is problematical and no satisfactory results can be achieved.

The inventor has faced the task of developing a process and a device of the type described initially which in industrial operation guarantee problem-free economic application of the continuous protective film onto the internal longitudinal weld seam. In particular the continuous protective film should remain constant in thickness and form even in the area of the weld seam where the curvature fluctuates between successive tube bodies. The protective film should be structured with adjustable thickness over the width.

SUMMARY OF THE INVENTION

With regard to the process, the task is solved according to the invention in that the continuously supplied thermoplastic material is preheated in the area of the application arm, melted and, under homogeneous liquefaction, passed to the application nozzle, the nozzle opening of which is guided at an adjustable constant distance from the inside of the longitudinal weld seam of the metal tube, and the liquid plastic applied is in metered quantities. Special and further design forms of the process are the subject of dependent claims.

Preferably a protective film 10 to 150 μm, in particular 20 to 50 μm thick is applied, which depending on the structure of the weld seam is suitably 3 to 30 mm wide. Depending on the structure of the nozzle opening, the thickness of the protective film is constant over the entire width or slightly thicker in the centre where usually greater protection is required. The design of the nozzle opening is described in more detail below.

The most suitable thermoplastic material, also referred to as "hotmelt", is polyester which is relatively costly but strong and in particular foodstuff-tolerant. For non foodstuff-tolerant industrial cans, polyurethane or in special cases even hardening epoxy resin can be used.

In a first design form of the invention, the thermoplastic material is supplied to the application arm in the form of a bead through the welding arm, firstly preheated in a preheating zone to a temperature of preferably around half the melt temperature and then passed to a liquefaction zone with a duct running in the same direction, where it is melted. The bead pushed into this duct is at first solid and melts continuously as it is pushed along. The melted plastic flows preferably back along the pushed bead and can be deflected into a further duct leading to the application nozzle. The duct and nozzle outlet opening are preferably dimensioned and matched to the advance of the plastic bead such that the melted plastic flows out in metered quantities but no pressure can build up in the melting device.

The term "plastic bead" or "hotmelt bead" comprises also threads, cords and similar masses which are long in comparison with their cross-section.

The preheating zone also has the advantage that when switched off, no heat can flow back and melt the plastic bead outside the equipment.

The plastic bead is heated in a preheating zone for example to 140 to 160° C. and pushed through a sealed opening into the duct of the liquefaction zone where the temperature is increased, depending on material, to a range of for example 220 to 280° C.

When the melting device is switched on, the preheating zone suitably remains cold at first, this is only switched on around 10 minutes after the heating cartridge for the liquefaction.

In another variant, the thermoplastic material is supplied not only in bead form but also in another suitable form, for example in granulate form or rod form according to EP, A1 0548 011, melted and homogeneously liquefied and passed to the application nozzle.

Depending on the material of the protective film applied, the metal tubes with the internally coated weld seam can still be passed in-line through a heating zone. This homogenizes further the protective film applied. This is necessary in particular if an epoxy resin is used which is relatively difficult to melt, where a longer heating zone than normal is required.

With regard to the device for performance of the process, the task is solved by the invention in that the melting device has means for guiding the outlet opening of the application nozzle at an adjustable regular distance from the inside of the weld seam. Special and further design forms of the device are the subject of dependent patent claims.

The means for guiding the outlet opening of the application nozzle at a constant distance are diverse:

A tracking roller and an application nozzle are mounted on a swivellable arm. The tracking roller rolls on the continuous inner side of the weld seam of the metal tube. The preceding welding process leads to the metal tube having different degrees of curvature in the area of the longitudinal weld seam. According to the invention, the tracking roller always runs on the weld seam and even with different curvatures of the metal tube, the applied protective film is always precisely the same thickness.

The common swivel arm of the tracking roller and the application nozzle can contain the entire melting device or also just part thereof.

The tracking roller and the application nozzle can be mounted on a slider in the melting device displaceable perpendicular to the direction of movement of the metal tube, where the said slider presses the tracking roller against the inside of the weld seam of the metal tube. Here too the tracking roller rises above the application nozzle by an adjustable distance.

In both the variants above, the tracking roller can be replaced by a sliding shoe which fulfils a similar function. Here again it is essential that the sliding shoe rises above the outlet opening of the application nozzle by the adjustable distance. The sliding shoe consists for example of ceramic with a low coefficient of friction and high abrasion resistance.

A spacer designed as a tracking roller or sliding shoe is preferably pressed or pulled by spring force against the inside of the weld seam. However other known means can also be applied, e.g. pneumatic or magnetic.

The distance from the inside of the weld seam can be measured not only mechanically but also continuously with a sensor, which is known in itself, analyzed electronically and modified by electrical impulses at an actuator which sets the distance from the outlet opening of the application nozzle to the inside of the weld seam. Suitable sensors which are known in themselves are for example eddy current, ultrasound, laser, capacitative or inductive sensors.

The preheating with the preheating zone and the melting device with the liquefaction zone are preferably arranged immediately next to each other.

To summarize, it can be emphasised again that the present invention allows, by simple means, a continuous protective film of a thermoplastic material to be applied to the inside of the longitudinal weld seam of metal tubes, where the said film always has precisely the same thickness irrespective of the distortions indisputably occurring on welding. Tearing of the film or thicker points in the transverse direction are no longer possible, which is of essential importance in particular for foodstuff-tolerant metal tubes. Furthermore, the welding and homogeneous liquefaction of the thermoplastic material is ensured in a simple and secure manner before it enters the application nozzle.

BRIEF DESCRIPTION OF THE DRAWINGS

The invention is described in more detail using the design examples in the drawings which are also the subject of dependent claims. These show in diagrammatic form:

DETAILED DESCRIPTION OF THE INVENTION

Figure 1:
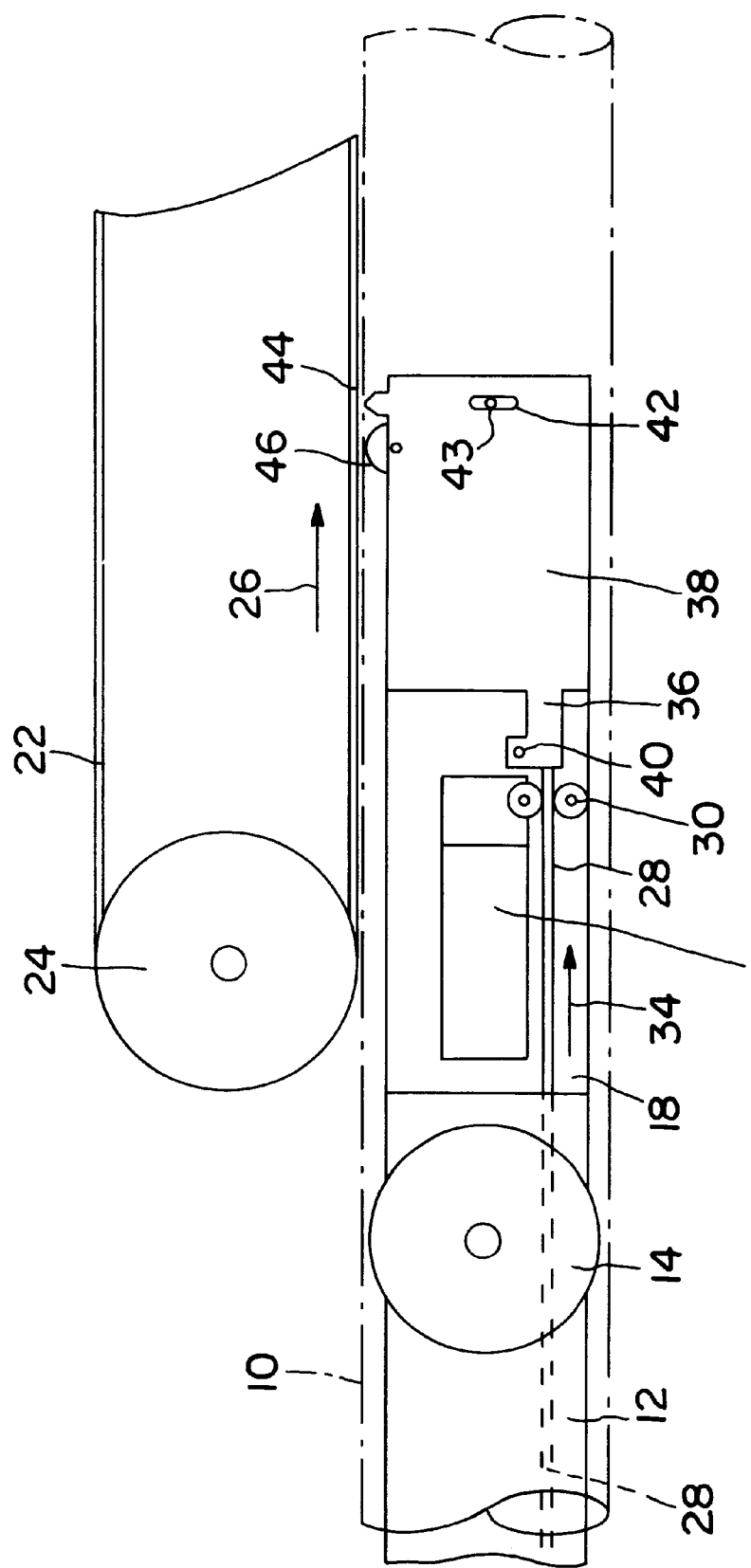
FIG. 1 an overview of the area of the welding arm and the application arm with melting device on a welding machine FIG. 2 the principle of a melting device swivellable in the application arm FIG. 3 a melting device with a preheating and liquefaction zone FIG. 4 the outlet opening of an application nozzle FIG. 5 an application nozzle from a front view FIG. 6 the application nozzle in FIG. 5 in a side view FIG. 7 a partial cross-section through a metal tube in the area of the longitudinal weld seam, and FIG. 8 an enlargement of area A in FIG. 7.

Of a welding machine for the production of metal tubes 10, FIG. 1 shows only the welding arm 12 with welding roller 14 to form a longitudinal weld seam 16 (FIG. 8) of the metal tube 10. An application arm 18 for a protective film 20 (FIG. 8) is provided on the inside of weld seam 16 in coaxial extension of the welding arm 12 and flush with its outside.

On the metal tubes 10, in the present case steel tubes, lies an endless conveyor belt 22 which is tensioned and driven by a deflector roller 24. The metal tubes are transported in the direction of arrow 26 and guided through a subsequent heating zone, not shown.

A hotmelt bead 28 shown in dotted lines in the area of welding arm 12 runs through a pair of rollers 30 which serve to guide and advance the material of the bead 28. At least one of the two rollers 30 is driven, according to FIG. 1 the upper roller 30, with an electric motor 32. The bead, with a diameter in the range from around 2 to 4 mm, is pushed via the conveyor device indicated by arrow 34 over a preheater 36 into a melting device 38. The melting device 38 as a whole can swivel about the suspension 40. A slot 42 limiting this swivel movement is penetrated by a suspension element 43 for the melting device 38.

Figure 8:
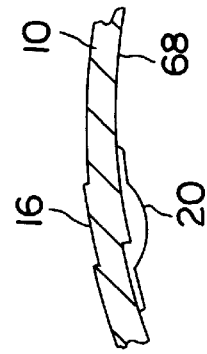

On the frame for the melting device 38 is attached an application nozzle 44 for application of the protective film 20 (FIG. 8) and a tracking roller 46 as a spacer. The tracking roller 46 rises above the application nozzle 44 of the protective film 20 (FIG. 8). Means, not shown in FIG. 1, press the melting device 38 over the tracking roller 46 and the distance from the outlet opening of application nozzle 44 is held constant.

Figure 2:
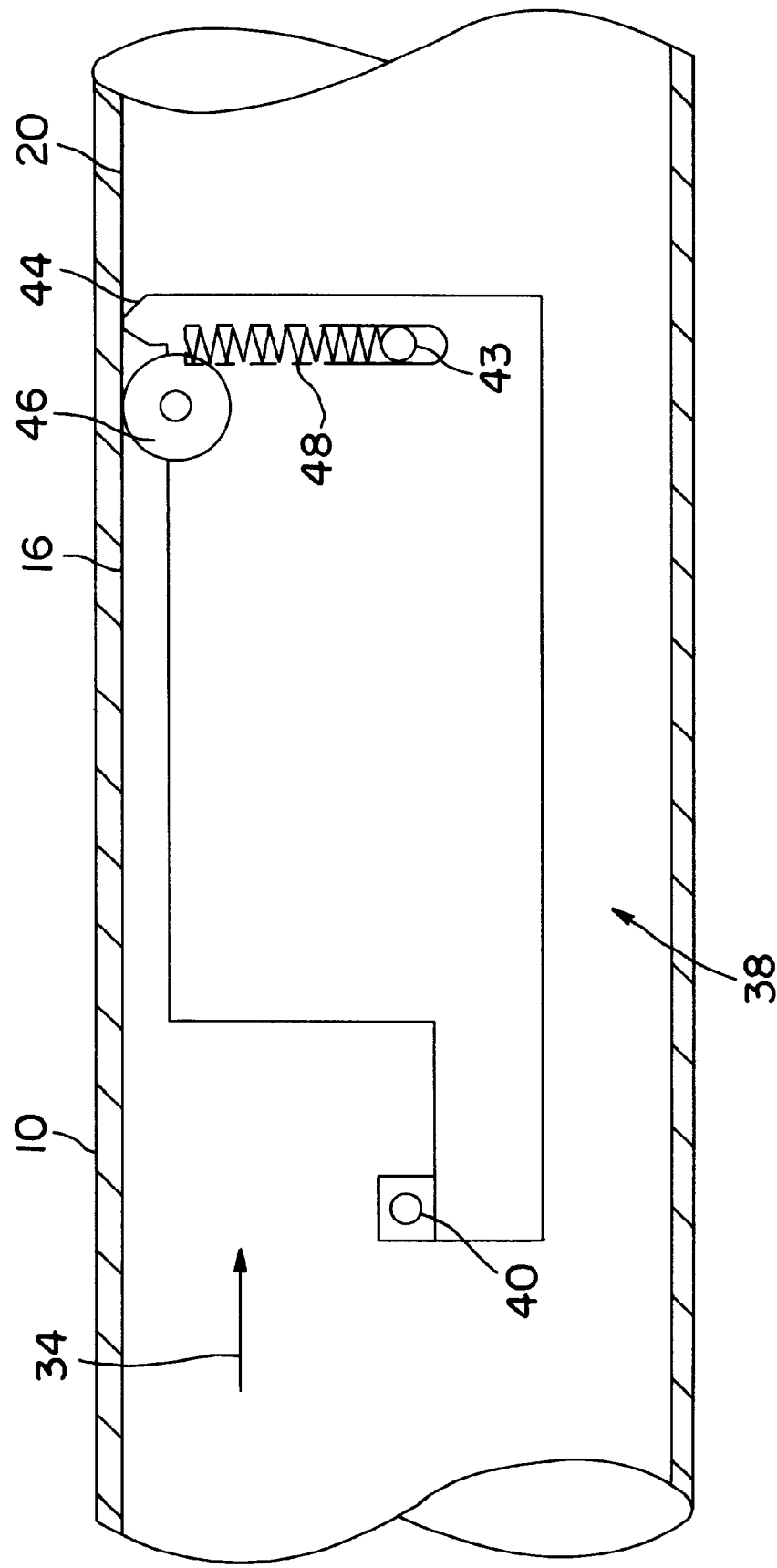

FIG. 2 shows the swivellable suspension of the melting device 38 as a whole. A spring 48 supported on the suspension element 43 presses the tracking roller 46 of the melting device 38 onto the longitudinal weld seam 16 of a metal tube 10. The application nozzle 44 or its outlet opening always has a constant distance from the weld seam 16. The geometric shape of the metal tube is never precisely cylindrical, during the welding process distortions, curvatures etc. always occur. The pressed on tracking roller 46 can follow these distortions as the entire melting device 38 swivels about suspension 40. The spring 48 can thus lift the melting device 38 and press it into place. The distance of the application nozzle 44 from the longitudinal weld seam thus remains always constant as stated.

Figure 3:
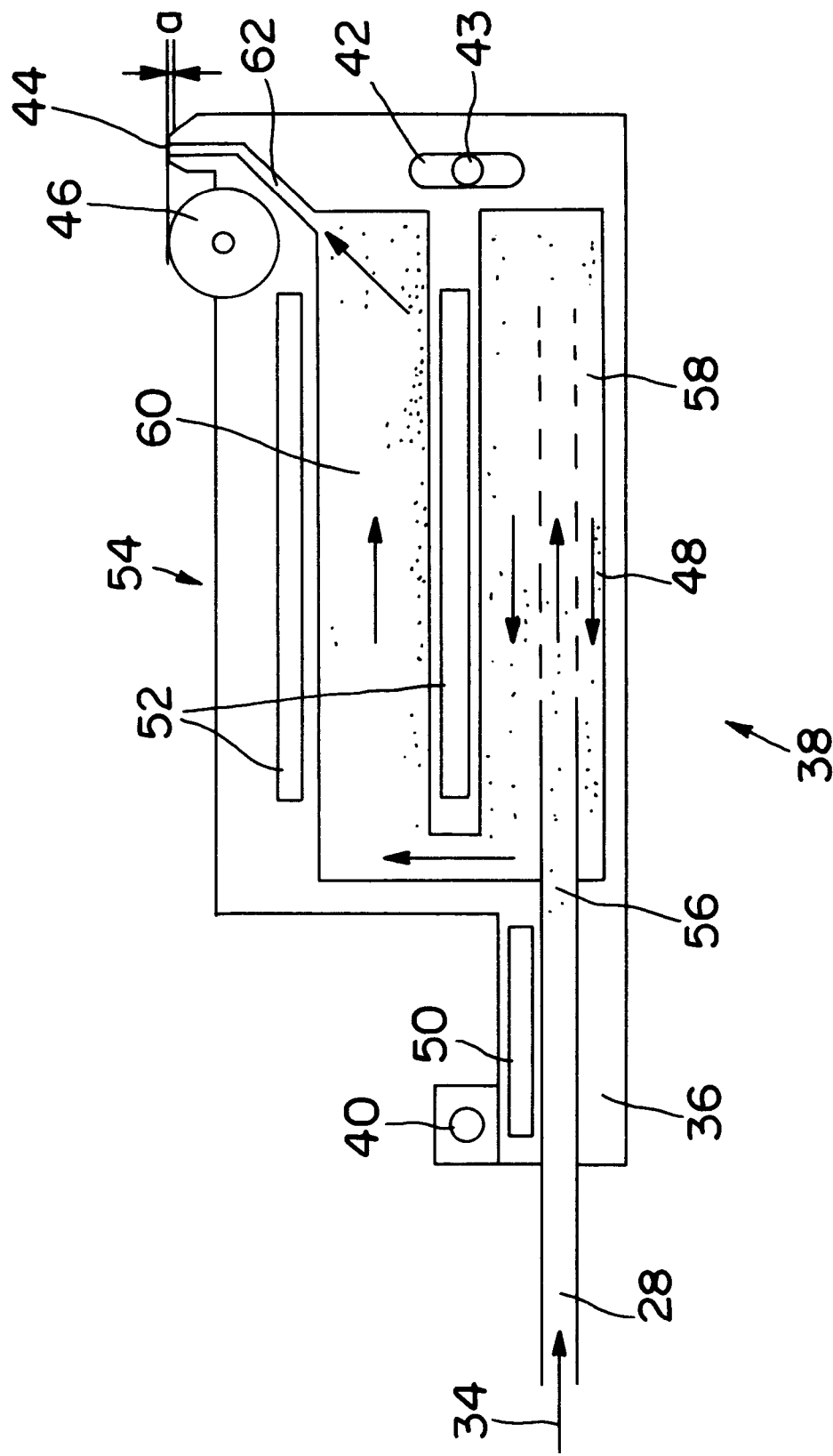

FIG. 3 shows the material flow 48 in the area of the melting device 38 and the heating cartridges 50, 52 used in the area of the preheating zone 36 and a liquefaction zone 54. The bead 28 of a thermoplastic material or hotmelt is pushed in the direction of the arrow through the preheating zone 36 where it is heated to around 150° C. The preheated bead enters a melt duct 58 through a sealed opening and is repelled by back-flowing melted material. The further the bead 28 is pushed into the melting duct, the more it softens, becomes pasty and finally liquid. This is indicated by the bead 28 being drawn first with longer, then with shorter dashes and finally with dots.

The bead 28, pushed further in, presses the melted material along the inserted bead into a homogenization duct 60, here lying above, where homogeneous liquefaction of the application material takes place. Finally, the homogeneously liquefied application material, via an application duct 62, reaches the application nozzle 44, a wide slot nozzle with a large outlet opening in relation to the supply of application material, i.e. the advance of the hotmelt bead 28, which prevents a pressure build-up in the melting device 38. This outlet opening of the application nozzle 44 is arranged lower than the tracking roller 46 by distance a.

Figure 4:
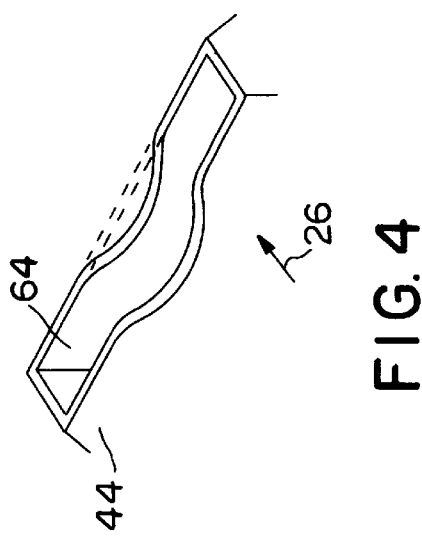

FIG. 4 shows the outlet opening 64 of an application nozzle 44, a wide slot nozzle. This outlet opening 64 is essentially rectangular. The two opposing long walls of the application nozzle 44 are formed recessed in the centre area, in other words material is removed from the side walls which thicken in the direction facing away from the outlet opening. The result is that on application of the protective film 20 (FIG. 2) essentially more coating material flows out in the centre area of the nozzle. In the centre area the protective film 20 is thicker than in the two peripheral areas. The recess in the long walls of the nozzle can in principle be of any shape. The thickening of the protective film in the centre area is the greater, the more material is removed from the side walls.

Material may also be removed from only the long side wall of the application nozzle 44 lying downstream of the advancing device 34. The long side wall of the application nozzle 44 lying upstream in this case remains unchanged, as indicated by dotted lines.

Figure 5:
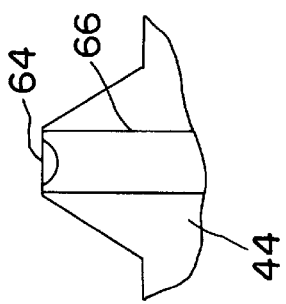

FIG. 5 shows the area of the outlet opening 64 of an application nozzle 44 in cross-section. The section plane lies in the longitudinal direction of the outlet opening 64. The wide material flow of liquefied thermoplastic material in the direction of the outlet opening 64 prevents, as already stated, a pressure build-up in the melting device (38 in FIG. 3) and allows covering of the weld seam over the entire width.

Figure 6:
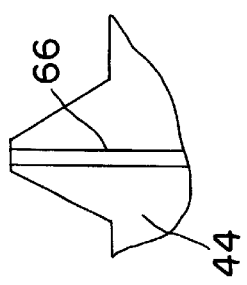

FIG. 6 shows this application nozzle in side cross-section, the material flow 66 here only has a small thickness, for example 1 mm.

Figure 7:
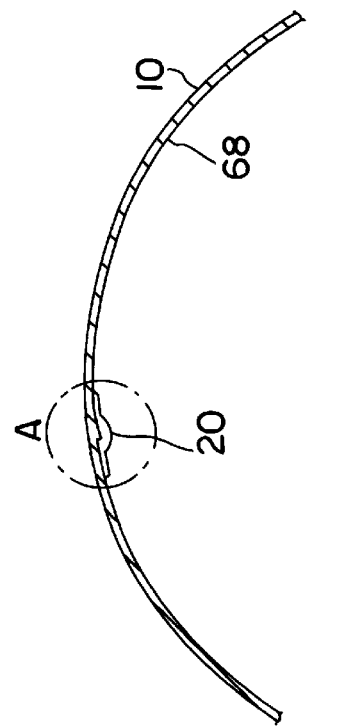

FIGS. 7, 8 show a metal tube 10 with a longitudinal weld seam 16 which is covered on the inside 68 with a protective film 20. The longitudinal thickening of the protective film 20 in the centre area, directly on the weld seam 16, can be clearly seen, less material is applied in both side areas.

What is claimed is:

1. Process for application of a continuous protective film (20) of a thermoplastic material to an inside surface (68) of a longitudinal weld seam (16) on metal tubes (10) which, lying against each other at the ends, are guided over a welding arm (12) of a welding machine and an attached application arm (18), where the thermoplastic material is continuous melted and applied by means of an application nozzle (44) at least over the entire width of the weld seam (16), characterized in that the continuously supplied thermoplastic material is preheated in the area of the application arm (18), melted and, under homogeneous liquefaction, passed to the application nozzle (44) having an outlet opening (64) of which is guided at an adjustable constant distance (a) from the inside surface of the longitudinal weld seam (16) of the metal tube (10), and the liquid thermoplastic is applied in metered quantities.

2. Process according to claim 1, characterized in that a protective film (20) of thickness 10 to 150 µm, is applied directly onto the weld seam (16), thicker in the center than in the two side areas.

3. Process according to claim 1, characterized in that a protective film (20) of a foodstuff-tolerant hotmelt, is applied.

4. Process according to claim 1, characterized in that the plastic is guided, in the form of a bead (28), in rod or granulate form to the application arm (18), heated in a preheating zone to around half the melting temperature, and pushed through a sealed opening (56) into a melt duct (58) of a liquefaction zone (54).

5. Process according to claim 4, characterized in that a heating cartridge (50) of the preheating zone (36) is switched on after a time delay, after switching on a heating cartridge (52) of the liquefaction zone (54).

6. Process according to claim 1, characterized in that the metal tubes (10) with the protective film (20) applied to the longitudinal weld seam (16) are passed through an in-line heating zone.

7. Device for performance of the process in accordance with claim 1, characterized in that the melting device (38) has means for guiding the outlet opening (64) of the application nozzle (44) at an adjustable regular distance (a) from the inside surface of the longitudinal weld seam (16).

8. Device according to claim 7, characterized in that the application nozzle (44), guiding means, and melting device, are arranged on movable means where a tracking roller (46) rolls on the longitudinal weld seam (16), and the application nozzle (44) is guided at the adjustable distance (a).

9. Device according to claim 8, characterized in that the movable means is moved by spring force (48) against the inside surface of the weld seam (16).

10. Device according to claim 7, characterized in that a sensor is provided for setting the distance between the application nozzle (44) and the longitudinal weld seam (16), which triggers an actuator.

11. Device according to claim 7, characterized in that the application nozzle (44) is formed as a slot nozzle, also with an enlarged outlet opening (64) in the longitudinal center area.

12. Process according to claim 1, characterized in that a protective film (20) of thickness 20 to 50 µm, is applied directly onto the weld seam (16), thicker in the center than in the two side areas.

13. Process according to claim 3, wherein the protective film is a polyester.

14. Process according to claim 3, wherein the protective film is a polyurethane.

15. Process according to claim 4, characterized in that the melting temperature is between 140° C. to 160° C.

* * * * *